(12) United States Patent
Froelich et al.

(10) Patent No.: US 9,946,683 B2
(45) Date of Patent: Apr. 17, 2018

(54) REDUCING PRECISION TIMING MEASUREMENT UNCERTAINTY

(71) Applicant: Intel Corporation, Santa Clara, CA (US)

(72) Inventors: Daniel Froelich, Portland, OR (US); David J. Harriman, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 462 days.

(21) Appl. No.: 14/582,734

(22) Filed: Dec. 24, 2014

(65) Prior Publication Data

US 2016/0188524 A1   Jun. 30, 2016

(51) Int. Cl.
  *G06F 13/00*   (2006.01)
  *G06F 13/42*   (2006.01)
  *G06F 13/40*   (2006.01)

(52) U.S. Cl.
  CPC ...... *G06F 13/4286* (2013.01); *G06F 13/4059* (2013.01)

(58) Field of Classification Search
  CPC .................. G06F 13/4286; G06F 13/4059
  USPC ....................................................... 710/301
  See application file for complete search history.

(56) References Cited

U.S. PATENT DOCUMENTS

| | | | | |
|---|---|---|---|---|
| 3,971,891 A | * | 7/1976 | Wolcott | H04J 3/1647 341/141 |
| 4,692,894 A | * | 9/1987 | Bemis | G06F 5/12 370/545 |
| 4,803,726 A | * | 2/1989 | Levine | H04K 1/00 370/350 |
| 6,791,987 B1 | * | 9/2004 | Eng | H04L 12/40026 370/395.62 |
| 7,581,026 B2 | | 8/2009 | Harriman et al. | |
| 7,769,883 B2 | | 8/2010 | Harriman | |
| 7,899,111 B2 | | 3/2011 | Sharma et al. | |
| 7,899,943 B2 | | 3/2011 | Ajanovic et al. | |
| 7,930,566 B2 | | 4/2011 | Ajanovic et al. | |
| 7,949,794 B2 | | 5/2011 | Ajanovic et al. | |
| 8,073,981 B2 | | 12/2011 | Ajanovic et al. | |

(Continued)

FOREIGN PATENT DOCUMENTS

| | | |
|---|---|---|
| CN | 100338593 C | 9/2007 |
| CN | 101630301 B | 3/2013 |

(Continued)

OTHER PUBLICATIONS

Ajanovic, et al., "PCI Express Enhancements and Extensions", T.W. Patent Application No. 104101070, filed on Jan. 13, 2015, pp. 1-60.

(Continued)

*Primary Examiner* — Paul R Myers
(74) *Attorney, Agent, or Firm* — International IP Law Group, P.L.L.C.

(57) ABSTRACT

Techniques for reducing precision timing message uncertainty are described herein. A method includes resetting an elastic buffer of a first device in response to a second device linked with the first device sending SKIP (SKP) ordered sets to the first device. The method also includes initiating a PTM handshake with the second device in response to resetting the elastic buffer. Additionally, the method includes sending PTM messages to the second device immediately after receiving the SKP ordered sets.

22 Claims, 4 Drawing Sheets

(56) References Cited

U.S. PATENT DOCUMENTS

| | | | |
|---|---|---|---|
| 8,099,523 B2 | 1/2012 | Ajanovic et al. | |
| 8,161,210 B1* | 4/2012 | Norrie | H04L 25/14 710/33 |
| 8,218,580 B2 | 7/2012 | Harriman | |
| 8,230,119 B2 | 7/2012 | Ajanovic et al. | |
| 8,230,120 B2 | 7/2012 | Ajanovic et al. | |
| 8,385,333 B2 | 2/2013 | Stanton et al. | |
| 8,447,888 B2 | 5/2013 | Ajanovic et al. | |
| 8,549,183 B2 | 10/2013 | Ajanovic et al. | |
| 8,555,101 B2 | 10/2013 | Ajanovic et al. | |
| 8,582,602 B2 | 11/2013 | Harriman | |
| 8,782,321 B2 | 7/2014 | Harriman et al. | |
| 2003/0110317 A1 | 6/2003 | Ajanovic et al. | |
| 2005/0005051 A1* | 1/2005 | Tseng | G06F 13/385 710/310 |
| 2005/0141661 A1* | 6/2005 | Renaud | G06F 13/385 375/372 |
| 2006/0230215 A1* | 10/2006 | Woodral | G06F 5/12 710/310 |
| 2008/0141063 A1* | 6/2008 | Ridgeway | G06F 5/12 713/501 |
| 2008/0196034 A1 | 8/2008 | Ajanovic et al. | |
| 2009/0086874 A1* | 4/2009 | Wang | H04L 7/005 375/372 |
| 2009/0296740 A1* | 12/2009 | Wagh | H04L 69/22 370/475 |
| 2010/0251001 A1* | 9/2010 | Drescher | G01R 31/3177 714/2 |
| 2010/0315135 A1* | 12/2010 | Lai | G06F 5/06 327/145 |
| 2012/0280721 A1* | 11/2012 | Park | H03K 5/2445 327/76 |
| 2013/0114602 A1 | 5/2013 | Harriman | |
| 2013/0117490 A1 | 5/2013 | Harriman | |
| 2013/0145049 A1 | 6/2013 | Stanton et al. | |
| 2014/0101356 A1* | 4/2014 | Sonoda | G06F 13/4027 710/313 |
| 2014/0105108 A1 | 4/2014 | Harriman | |
| 2014/0105228 A1 | 4/2014 | Harriman | |
| 2014/0133499 A1 | 5/2014 | Harriman | |
| 2014/0344500 A1 | 11/2014 | Harriman et al. | |
| 2015/0131766 A1* | 5/2015 | Chen | H04L 7/033 375/372 |

FOREIGN PATENT DOCUMENTS

| | | |
|---|---|---|
| CN | 101937253 B | 3/2013 |
| DE | 10085140 | 11/2002 |
| DE | 102009032581 B4 | 5/2012 |
| DE | 112010002783 T5 | 8/2012 |
| GB | 2372359 B | 8/2004 |
| GB | 2461802 B | 4/2012 |
| JP | 4909384 B2 | 4/2012 |
| JP | 5422005 B2 | 2/2014 |
| KR | 1004178390000 | 1/2004 |
| KR | 1004327010000 | 5/2004 |
| KR | 1014671670000 B1 | 11/2014 |
| SG | 80713 | 5/2003 |
| SG | 88496 | 5/2004 |
| TW | I259694 | 8/2006 |
| TW | I424317 B | 1/2014 |
| TW | I428753 B | 1/2014 |
| TW | I430099 B | 3/2014 |
| TW | 201428498 A | 7/2014 |
| TW | I443520 B | 7/2014 |
| TW | I444828 B | 7/2014 |
| WO | 2011008327 A1 | 1/2011 |

OTHER PUBLICATIONS

Harriman et al., "A Method, Apparatus and System for Measuring Latency in a Physical Unit of a Circuit", U.S. Appl. No. 14/126,926, filed Oct. 30, 2013.

Harriman, et al., "A Method, Apparatus and System for Measuring Latency in a Physical Unit of a Circuit", W.O. Patent Application No. PCT/US2013/067396, filed on Oct. 30, 2013, pp. 1-51.

Harriman, et al., "Arapahoe Architecture and Protocol", U.S. Appl. No. 60/314,708, filed Aug. 24, 2001.

Harriman, et al., "PCI Express Tunneling Over a Multi-Protocol I/O Interconnect", B.R. Patent Application No. 102013003220-4, filed on Feb. 8, 2013, pp. 1-100.

* cited by examiner

100

200

400

REDUCING PRECISION TIMING MEASUREMENT UNCERTAINTY

TECHNICAL FIELD

This disclosure relates generally to the Precision Timing Measurement mechanism. Specifically, this disclosure relates to Precision Timing Measurement uncertainty in connected devices.

BACKGROUND

One type of connection between devices is a peripheral component interface express (PCIe) connection. PCIe defines a Precision Timing Measurement (PTM) mechanism that allows two PCIe devices, a transmitter and receiver, to establish common timing through a sequence of repeated messages. These messages enable the devices to exchange timing or clock information. However, PCIe devices take the time measurement internally, after some amount of processing. Yet, the protocol defines time measurement as observed at the components' pins. Due to this difference in when the time is measured and when the time is considered to be measured, the accuracy of the PTM may be diminished by how much time passes between the time when packets pass over the pins, and when the packets are processed internally.

BRIEF DESCRIPTION OF THE DRAWINGS

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
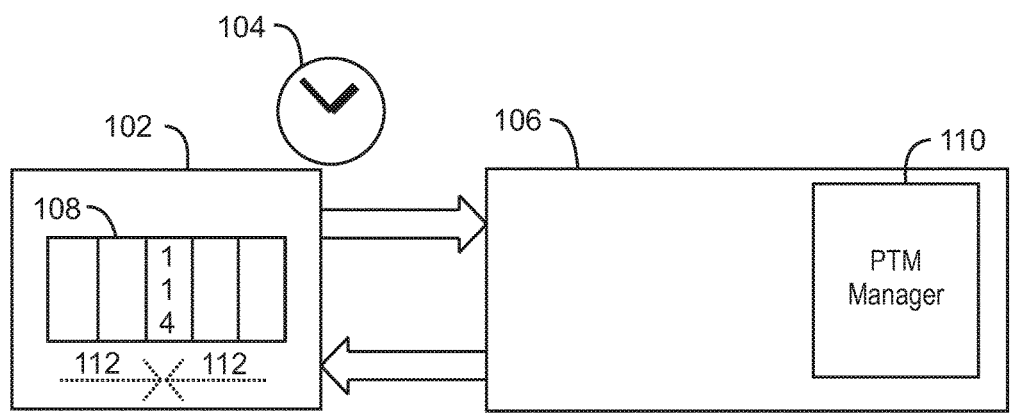
FIG. 1 is a block diagram of a system for reducing precision timing message uncertainty.

There is variation and uncertainty for applications that are trying to establish precise timing consistency between devices communicating across an interconnect fabric architecture. Accordingly, examples of the present techniques may reduce this uncertainty without changing the physical hardware implementations. Existing mechanisms for synchronizing the timing may be scheduled in a way that reduces the uncertainty in the transmit delay of PTM messages, when compared to standard implementations. This is also useful when links are operating in SRIS mode with small link widths in an interconnect fabric architecture.

One interconnect fabric architecture includes the Peripheral Component Interconnect Express (PCIe) architecture. One goal of PCIe is to enable components and devices from different vendors to inter-operate in an open architecture, spanning multiple market segments: Clients (Desktops and Mobile), Servers (Standard and Enterprise), and Embedded and Communication devices. PCIe is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCIe take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCIe.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems advance, the components therein are becoming more complex. As a result, the interconnect architecture to couple and communicate between the components is also increasing in complexity to ensure bandwidth requirements are met for optimal component operation.

Furthermore, different market segments demand different aspects of interconnect architectures to suit the market's needs. For example, servers require higher performance, while the mobile ecosystem is sometimes able to sacrifice overall performance for power savings. Yet, it is a singular purpose of most fabrics to provide the highest possible performance with maximum power saving. Below, PCIe is discussed, which potentially benefits from aspects of the present techniques described herein. Although the present techniques are not limited to PCIe, and other interconnect fabric architectures may also benefit from examples of the present techniques.

In examples of the present techniques, the uncertainty in PTM message delay is reduced by scheduling PTM sequences immediately after sending SKIP (SKP) ordered sets. As part of the PCIe protocol, SKP ordered sets are periodically transmitted to compensate for differences in clock frequencies between the transmitter and receiver. Thus, the present techniques take advantage of the existing protocol, without taking up additional bandwidth.

FIG. 1 is a block diagram of a system 100 for reducing precision timing message uncertainty. The system 100 includes a device 102, with its own reference clock 104, and a device 106. It is understood that the PCIe protocol provides that each device 102, 106 acts as both a transmitter and receiver. As such, this simplified diagram is used to avoid confusion. However, in examples of the present techniques, each of the devices 102, 106 may represent either of a transmitter or receiver communicating with the other device over the PCIe connection.

The device 102 includes an elastic buffer 108, and the device 106 includes a PTM manager 110. The elastic buffer 108 is used in the receiver circuits of device 102 as part of the PCIe protocol to absorb differences between the rate of transmission of device 106 and the internal rate of reliever circuit processing in device 102. However, the accuracy of the timing of the PTM is impacted by variation in how long it takes for data packets to move through the elastic buffer 108. Because the amount of data in the elastic buffer 108 may vary over time, the amount of time it takes for packets to move through the elastic buffer 108 varies. This means that, even though the devices 102, 106 exchange clock information, the variation in the time it takes for this clock information to pass through the elastic buffer 108 may make the clock information less accurate. The PTM manager 110 coordinates the activities relating to the PTM protocol, including performing a PTM handshake between the devices 102, 106. By transmitting a series of SKP ordered sets before a PTM handshake, the PTM manager 110 places the elastic buffer 108 in a consistent state. Alternately, the PTM manager may be configured to schedule a PTM handshake to occur after a series of SKP ordered sets have been transmitted. In this way, the receipt of one or more SKP ordered sets resets the elastic buffer 108. The two arrows 112 below the elastic buffer 108 represent the idea that when a SKP ordered set is received, the elastic buffer 108 will go back to its neutral position 114. The neutral position 114 represents a consistent starting point that enables consistent timing for PTM messages. In the example elastic buffer 108, the neutral position 114 represents a halfway point, position 3 out of 5 total positions. In this example, the neutral position 114 is shown as being at the center of the elastic buffer 108, but in other implementations the neutral position is not required to be at the center of the elastic buffer. Because the elastic buffer 108 is in a consistent state at the neutral position 114 when the PTM messages are sent, the amount of time it takes to move through the elastic buffer 108 does not vary, in contrast to current systems.

Another issue can arise with PTM when the connection between the devices 102, 106, uses a clocking architecture with Independent SSC clocking, an example of which is the SRIS clocking architecture defined in PCIe. Spread-Spectrum Clocking (SSC) is an approach used to address potential electromagnetic interference from the reference clock 104. During a SSC modulation cycle, the energy of the clock signal is spread out over a number of frequencies. The modulated clock varies its frequency between two fixed frequency points over a set period of time. When the SRIS clocking architecture is used, the two devices 102, 106 use reference clocks that are allowed to be independent of each other. As such, the uncertainty due to the variation in the elastic buffer 108 is considerably increased, especially when narrow link widths are used in combination with large packet sizes, and can be up to several hundred nanoseconds.

Figure 2:
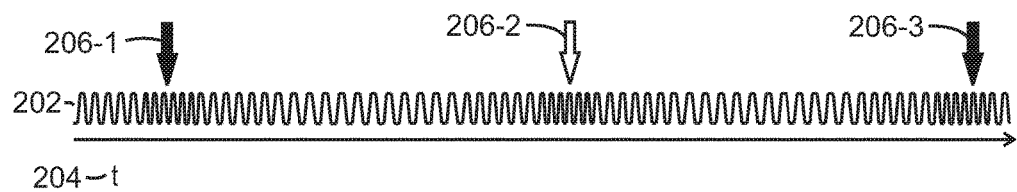
FIG. 2 is a diagram of a clock signal for a local reference clock used in a system with spread spectrum clock frequency modulation.

FIG. 2 is a block diagram 200 of a clock signal 202 for a local reference clock used in a system with SSC frequency modulation. It is noted that the diagram 200 is a simplified and exaggerated example. As understood by one of ordinary skill in the art, the change in frequency is not as dramatic as shown. Further, the period of the modulation is much greater relative to the primary clock frequency than this example, which is provided for reasons of clarity.

As shown, the clock signal 202 varies in frequency over time 204. The arrows 206-1, 206-2, 206-3 represent the same phases in successive SSC modulation cycles. In an example of the present techniques, the PTM manager 110 schedules PTM message sequences to begin at the same phase in the SSC modulation cycle. In an example of the present techniques, clock circuits of the device 106 generate a pulse at the same phase in each clock modulation cycle, indicating to the PTM Manager 110 to initiate a PTM messaging, ensuring the elastic buffer 108 is in a consistent state when the PTM handshake is initiated. In this way, the latency effects of the elastic buffer 108 are relatively more consistent when the PTM messages are exchanged. This is because, in the SRIS clocking architecture, the effects of SSC are the dominant factor affecting the latency through the elastic buffer 108. Thus, by causing the PTM exchanges to be initiated at the same phase in the SSC modulation cycle, the variability due to SSC is counteracted. It is noted however, the PTM message sequences may not be sent during every cycle. Rather, the PTM manager 110 may occasionally skip cycles based on the requirements of the specific PTM policy implemented. For example, PTM message sequences may be required only in every other cycle of the SSC modulation, in order to counteract a given amount of drift in a local time clock being synchronized.

In one example, these approaches can be applied unilaterally by the component initiating the PTM handshake, i.e., the transmitter or the receiver, based on its own reference clock. However, the approach can potentially work better in the case where it is known a-priori that the SSC period between the devices 102, 106 is matched, or otherwise correlated.

Figure 3:
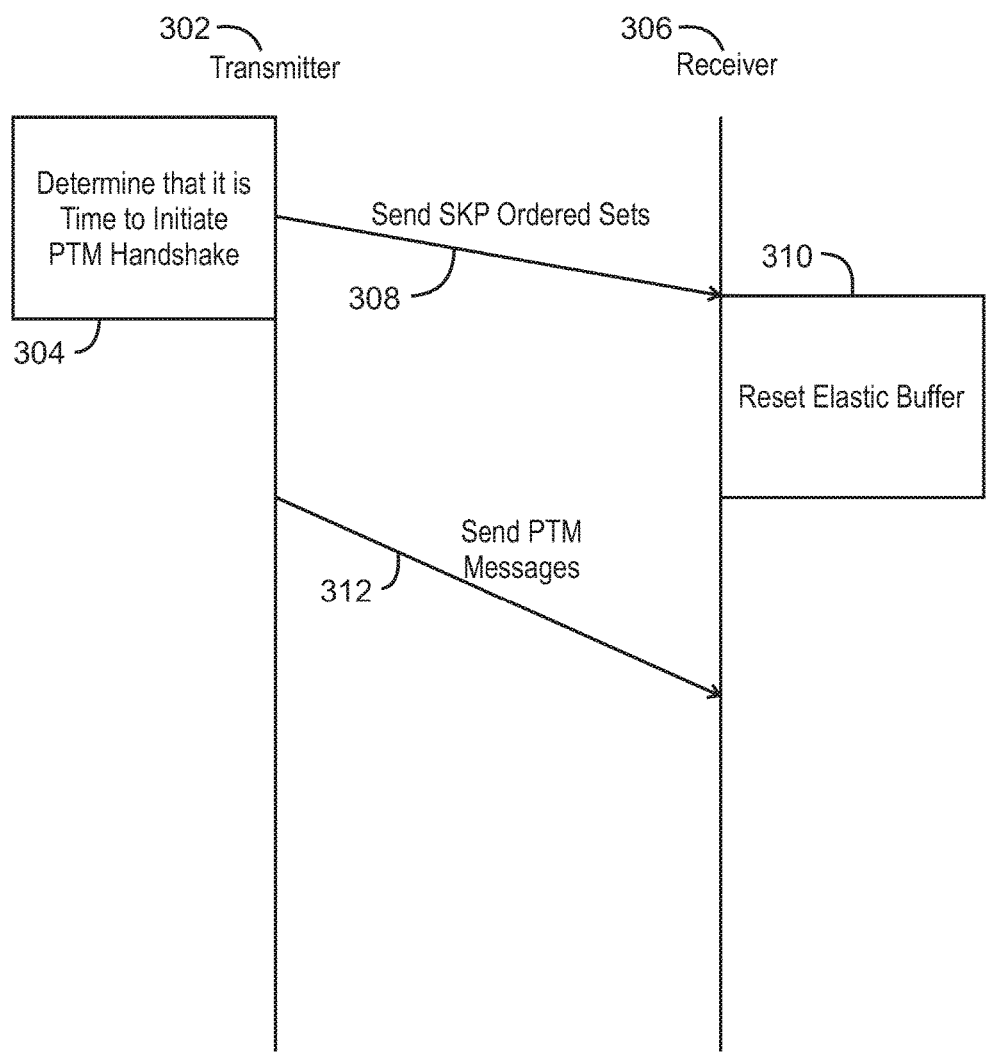
FIG. 3 is a ladder diagram illustrating messages exchanged between linked components reducing precision timing message uncertainty.

FIG. 3 is a ladder diagram illustrating messages exchanged between linked components reducing PTM uncertainty. As indicated at block 304, a transmitter 302, determines it is time to initiate a PTM handshake with a receiver 306. The transmitter 302 is a downstream port, and sends packets for one or more a SKP ordered sets, as indicated at 308. The SKP ordered sets are received at the receiver 306, which is an upstream port. The receiver 306 resets the elastic buffer 108, as indicated at 310. The transmitter 302 also sends PTM messages, as indicated at 312.

Figure 4:
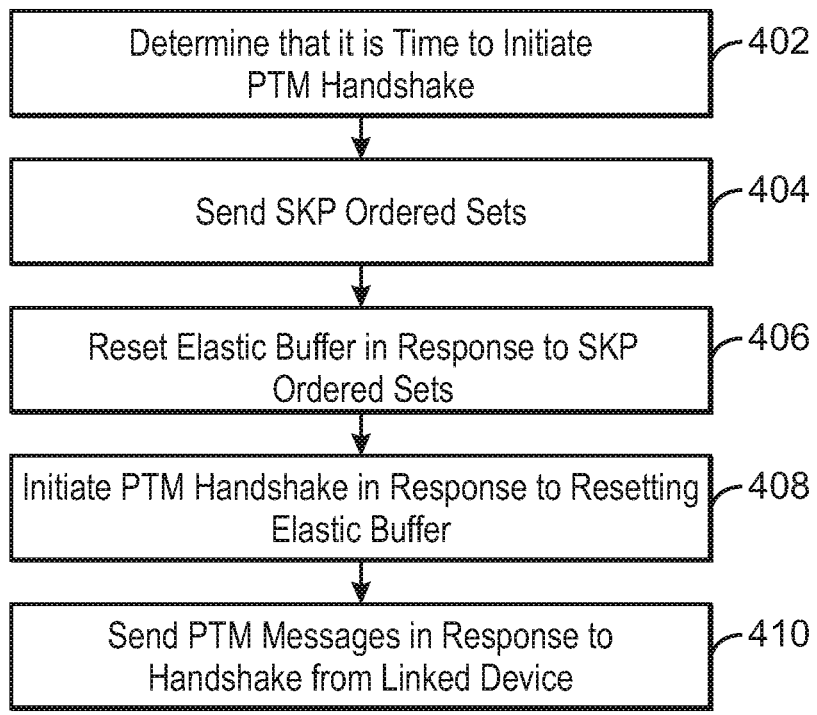
FIG. 4 is a method for reducing precision timing message uncertainty.

FIG. 4 is a process flow diagram of a method 400 for reducing precision timing messaging uncertainty. The method 400 is performed by the PTM manager 110 and the device 102, and begins at block 402, where the PTM manager 110 determines that it is time to initiate a PTM handshake between devices 102, 106. At block 404, the PTM manager 110 sends the SKP ordered sets to the device 102. At block 406, the device 102 resets the elastic buffer 108 in response to receiving the SKP ordered sets. At block 408, the PTM manager 310 initiates the PTM handshake between the devices 102, 106. At block 410, the PTM manager 110 sends PTM messages in response to the handshake from the device 102.

Both techniques reduce variation in the depth of the elastic buffer 108 of the device 102 when PTM messages are exchanged. Either method may be used depending on whether the SSC phase cycle information is available, and depending on whether the scheduling is flexible enough to be able to initiate PTM exchanges in close succession to the transmission of SKP ordered sets. It is also possible for additional improvement in the uncertainty of locally received PTM messages if the PTM manager 110 attempts to synchronize the transmission of SKP ordered sets to the expected time they are received from the link partner by observing the average interval of transmitted SKP ordered sets of the link partner.

EXAMPLES

An example includes a method for reducing precision timing measuring (PTM) uncertainty. The method includes resetting an elastic buffer of a first device in response to a second device linked with the first device sending SKIP (SKP) ordered sets to the first device. The method also includes initiating a PTM handshake with the second device in response to resetting the elastic buffer. Additionally, the method includes sending PTM messages to the second device immediately after receiving the SKP ordered sets. The method may include determining an average interval of the SKP ordered sets, and synchronizing transmission of the SKP ordered sets to an expected time based on the average interval. The method may include determining that it is time to initiate a PTM handshake, and sending the SKP ordered sets in response to the determination. The elastic buffer may be reset by setting the buffer at a neutral position. The neutral position may be a halfway point of the elastic buffer. The method may include generating a pulse from a reference clock indicating it is the time to initiate the PTM handshake. The method may include generating the pulse at a same phase of multiple cycles for a spread spectrum clock in an SRIS architecture.

An example includes an apparatus for reducing precision timing message uncertainty between linked devices. The apparatus includes a processor, an elastic buffer, and a memory comprising logic. According to the logic, the apparatus resets an elastic buffer of a first device in response to a second device linked with the first device sending SKIP (SKP) ordered sets to the first device. A PTM handshake is initiated with the second device in response to resetting the elastic buffer. PTM messages are sent to the second device immediately after receiving the SKP ordered sets. The apparatus may determine an average interval of the SKP ordered sets, and synchronize transmission of the SKP ordered sets to an expected time based on the average interval.

The apparatus of claim 8 determines that it is time to initiate a PTM handshake, sends the SKP ordered sets in response to the determination. The apparatus generates a pulse from a reference clock indicating it is the time to initiate the PTM handshake.

An example system for reducing precision timing message uncertainty, includes a transmitter device linked with a receiver device, the transmitter device comprising a transmitter reference clock, a transmitter elastic buffer; and a transmitter memory, the transmitter memory comprising logic to reset the transmitter elastic buffer in response to receiving SKP) ordered sets from a linked device. A PTM handshake is initiated with the linked device in response to resetting the elastic buffer. PTM messages are sent to the linked device immediately after receiving the SKP ordered sets.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for reducing precision timing measuring (PTM) uncertainty, the method comprising:
   sending SKIP (SKP) ordered sets to a first device comprising an elastic buffer in order to ensure the elastic buffer is reset at a consistent location before initiating a precision timing measurement (PTM) handshake; and
   initiating the PTM handshake with the first device after sending the SKP ordered sets.

2. The method of claim 1, comprising:
   determining an average interval of the SKP ordered sets; and
   synchronizing transmission of the SKP ordered sets to an expected time based on the average interval.

3. The method of claim 1, comprising:
   determining that it is time to initiate a PTM handshake; and
   sending the SKP ordered sets in response to the determination.

4. The method of claim 1, wherein resetting the elastic buffer comprises setting the elastic buffer at a neutral position.

5. The method of claim 4, the neutral position comprising a halfway point of the elastic buffer.

6. The method of claim 1, comprising generating a pulse from a reference clock indicating it is a time to initiate the PTM handshake.

7. The method of claim 6, comprising generating the pulse at a same phase of multiple cycles for a spread spectrum clock in a separate reference clock with independent spread (SRIS) architecture.

8. An apparatus for reducing precision timing message uncertainty between linked devices, the apparatus comprising:
   an elastic buffer; and
   a memory comprising logic to:
   send SKIP (SKP) ordered sets to a first device comprising an elastic buffer in order to ensure the elastic buffer is reset at a consistent location before initiating a precision timing measurement (PTM) handshake; and
   initiate a PTM handshake with the first device after sending the SKP ordered sets.

9. The apparatus of claim 8, the memory comprising logic to:
   determine an average interval of the SKP ordered sets; and
   synchronize transmission of the SKP ordered sets to an expected time based on the average interval.

10. The apparatus of claim 8, the memory comprising logic to:
    determine that it is time to initiate a PTM handshake; and
    send the SKP ordered sets in response to the determination.

11. The apparatus of claim 8, wherein the elastic buffer is reset by setting the elastic buffer at a neutral position.

12. The apparatus of claim 11, the neutral position comprising a halfway point of the elastic buffer.

13. The apparatus of claim 8, the memory comprising logic to generate a pulse from a reference clock indicating it is a time to initiate the PTM handshake.

14. The apparatus of claim 13, the memory comprising logic to generate the pulse at a same phase of multiple cycles for a spread spectrum clock in a separate reference clock with independent spread (SRIS) architecture.

15. The apparatus of claim 8, comprising a processor.

16. A system for reducing precision timing message uncertainty, the system comprising:
    a receiver device comprising an elastic buffer; and
    a transmitter device linked with the receiver device, the transmitter device comprising:
    a transmitter reference clock;
    a transmitter memory comprising logic to:
      send a series of SKIP (SKP) ordered sets to the receiver device in order to ensure the elastic buffer is reset to a consist location before initiating a precision timing measurement (PTM) handshake with the receiver device; and
      initiate the PTM handshake after the series of SKP ordered sets are sent.

17. The system of claim 16, the transmitter memory comprising logic to:
    determine an average interval of the SKP ordered sets; and
    synchronize transmission of the SKP ordered sets to an expected time based on the average interval.

18. The system of claim 16, the transmitter memory comprising logic to:
    determine that it is time to initiate a PTM handshake; and
    send the SKP ordered sets in response to the determination.

19. The system of claim 16, wherein the elastic buffer is reset by setting the elastic buffer at a neutral position.

20. The system of claim 19, the neutral position comprising a halfway point of the elastic buffer.

21. The system of claim 16, the transmitter memory comprising logic to generate a pulse from the transmitter reference clock indicating it is the time to initiate the PTM handshake.

22. The system of claim 21, the transmitter memory comprising logic to generate the pulse at a same phase of multiple cycles for a spread spectrum clock in a separate reference clock with independent spread (SRIS) architecture.

* * * * *